Sept. 7, 1965                M. H. WENNING                3,204,431
                          OVERLOAD RELEASE CLUTCH
Filed June 25, 1963                                    2 Sheets-Sheet 2

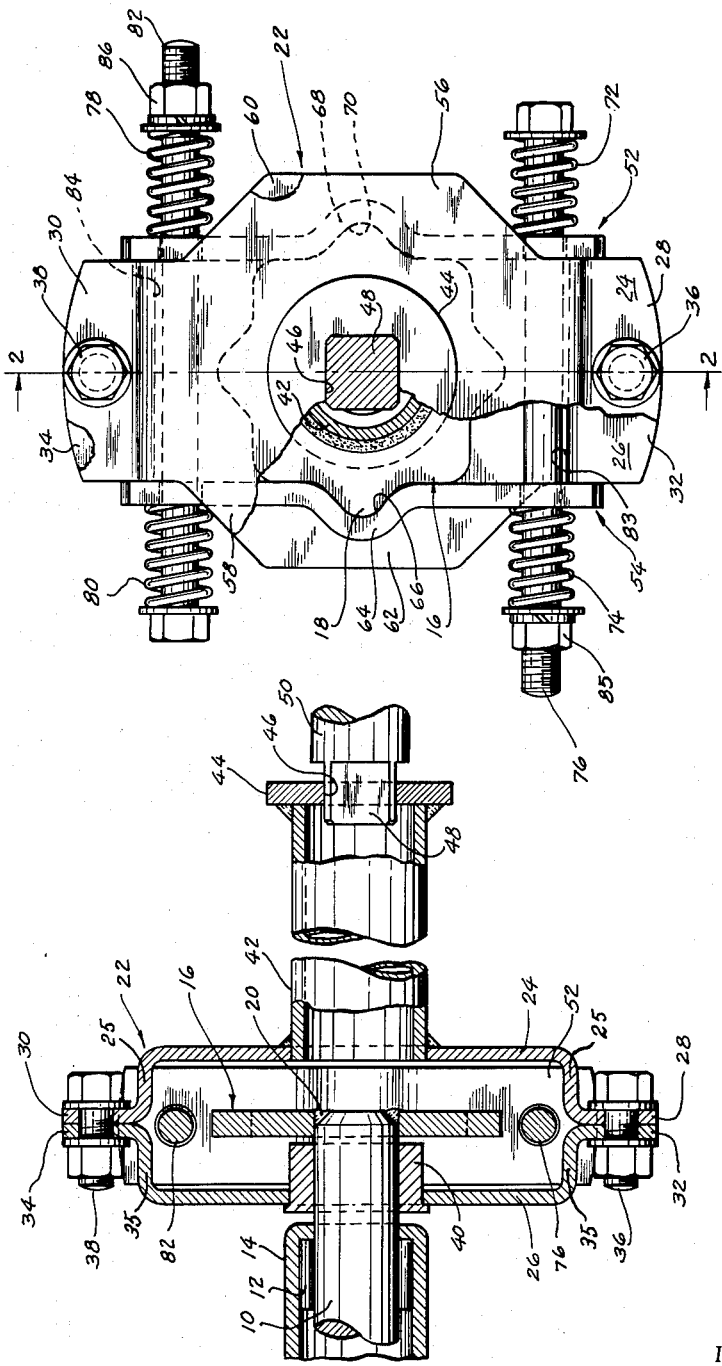

INVENTOR.
MAURICE H. WENNING.
BY
Emerson B Donnell
ATTORNEY

United States Patent Office 3,204,431
Patented Sept. 7, 1965

3,204,431
OVERLOAD RELEASE CLUTCH
Maurice H. Wenning, Moline, Ill., assignor to J. I. Case Company, Racine, Wis., a corporation of Wisconsin
Filed June 25, 1963, Ser. No. 290,434
7 Claims. (Cl. 64—29)

The present invention relates to machine elements and particularly to overload relief clutches, and an object of the invention is to generally improve the construction and operation of devices of this class.

In the past, overload relief clutches have been made in many ways and have often been quite complicated and characterized by what might be termed precision construction, requiring parts to be made of costly materials with dimensions held to relatively close limits. Under conditions of heavy loads and frequent operation, these devices have been satisfactory, but relatively costly. There are many applications where such precision is unnecessary, but where an overload release is essential, and the principal object of the invention is to provide a clutch which can be made of relatively inexpensive parts such for example, as stampings, and in which a very minimum of machining, if any, is required. The clutch of the present invention, nevertheless, is durable and reliable within its intended range of operation.

Furthermore, the clutch does not introduce an end thrust problem (as is characteristic of some prior art devices) and it does not require a substantial length of shaft in order to accommodate its components.

Also, the clutch may withstand a substantial amount of wear without seriously affecting its operation.

Suitable embodiments of the invention are described in the following specification and illustrated in the drawings, in which:

FIG. 1 is an end elevation, with parts broken away, of an overload release clutch embodying the invention;

FIG. 2 is a vertical axial section of the same on the line 2—2 of FIG. 1;

Similar reference characters have been applied to the same parts throughout the drawings and specification.

Figure 3:
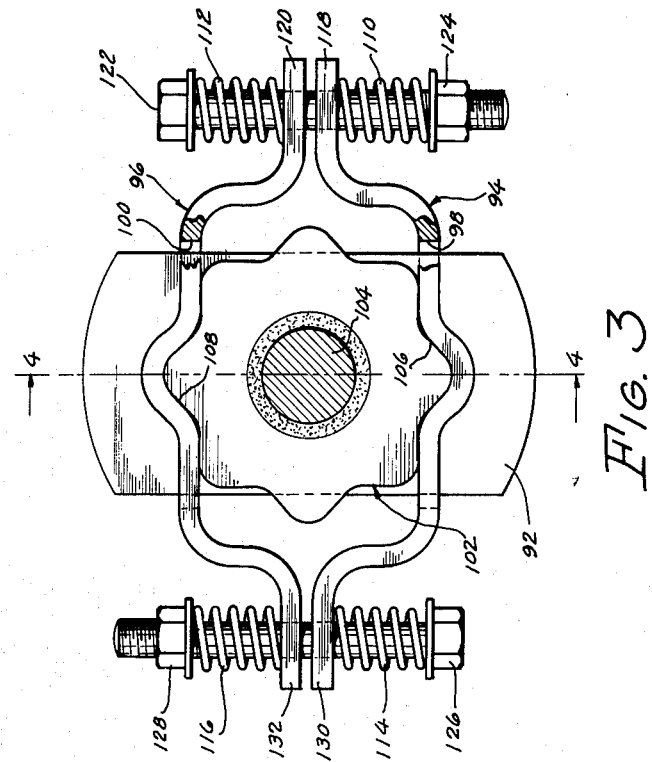
FIG. 3 is an end elevation of a modified form of the clutch mechanism partly broken away; and, FIG. 4 is a sectional view on the line 4—4 of FIG. 3.

Referring to FIGS. 1 and 2, an input shaft 10 is supported in any suitable way, as for example, in a bearing 12 carried in a support 14, and has fixed thereon a detent element or star wheel 16. Star wheel 16 has a plurality of relatively high teeth 18 about its periphery and is ruggedly fixed to shaft 10 as for example, by welding at 20.

Star wheel 16 is preferably enclosed in a housing 22, in the present instance made in the form of a pair of juxtapositioned yokes, plates, or shells 24 and 26. Shell 24 has portions 25 bent inwardly to form end closures for housing 22, and outwardly directed flanges 28 and 30 which are clamped in rigid contacting relation with flanges 32 and 34 respectively on shell 26. Similarly, shell 26 has inwardly bent portions 35 joining with flanges 32 and 34. Flanges 28 and 32 are united by suitable or well-known means, such as a bolt 36, while flanges 30 and 34 are similarly united by a bolt 38.

Shell 26 has rigidly fixed thereto a bearing sleeve 40 which in this embodiment is journaled on shaft 10, while shell 24 has a shaft means 42, in the present instance of tubular form, which in the operative position of the device extends substantially coaxially with above-mentioned shaft 10. Shaft means 42 is connected to the driven load in any suitable manner, but in the present instance has a plate or head 44 closing the end of shaft 42 and having a polygonal or square opening 46 engaged with a mating shank portion 48 on a driven shaft 50.

As so far described, it will be apparent that shaft 10 may rotate and cause rotation of detent wheel 16 within housing 22 without, however, causing rotation of housing 22 or of shafts 42 and 50.

It should also be noted that, while the device has been described as utilizing shaft 10 as an input shaft, and shaft 42 as an output shaft, the force could be equally well transmitted in the other direction within the contemplation of the invention. In other words, shaft 42 could be the input shaft and shaft 10 the output shaft.

To be effective, shaft 42 must be coupled to shaft 10 for normal operation, and this is accomplished by a pair of detent plates, jaws, or escape ratchet plates 52 and 54.

Shells 24 and 26 are provided with outwardly or radially extending flange portions 56, 58, 60 and 62, ratchet plate 52 being substantially normal to, and received and slidable between, flange portions 56 and 60, while ratchet plate 54 is received and slidable in like manner between flange portions 58 and 62. As will be apparent from FIG. 2, plate 52 may not shift substantially in relation to shells 24 and 26 except in a direction normal to shafts 10 and 42.

Ratchet plate 54 is provided with an offset portion 64, by bending or otherwise, which in effect provides a relatively generous or deep notch 66 substantially fitting one of the teeth 18 of star wheel 16. Similarly, plate 52 has an offset portion 68 which provides a notch 70 fitting in the present instance, a tooth 18 diametrically opposite to notch 66. Plates 52 and 54 are yieldingly held in the positions described by springs 72 and 74 on a bolt 76 together with springs 78 and 80 on a bolt 82. As will be apparent, escape plates 52 and 54 in effect constitute walls, closures, or sides for housing 22, and as a part thereof are carried in a circular path about shaft 10 whenever the housing rotates. The driving force or torque is imposed by star wheel 16 directly on escape plates 52 and 54. Assuming counterclockwise rotation as seen in FIG. 1, this would tend to move plate 52 upwardly and plate 54 downwardly in the position of the parts shown. With the normal freedom or looseness of bolts 76 and 82 in mechanism of this class, this force would cause a rocking displacement of the bolts so that they would forcibly engage the interior of shells 22 and 26 at points 83 and 84. The torque is therefore transmitted to housing 22, and thereby to shaft 42.

When springs 72, 74, 78 and 80 yield to overload conditions, escape plates 52 and 54 are outwardly displaced but, by reason of flanges 56, 58, 60 and 62, together with bolts 76 and 82, are guided in their outward movement in the direction of a predetermined radius of diameter of shaft 42, substantially on the diameter which happens to be horizontal in FIG. 1. It will be apparent that the outward movement of plates 52 and 54 will always be along this same predetermined diameter, no matter what the rotated position of housing 22.

As will apparent, so long as the power requirements of the driven machine are within the intended range, plates 52 and 54 will remain in engagement with the teeth of detent wheel 16, and a positive drive will be accomplished between shaft 10 and shaft 42. Under these conditions, plates 52 and 54 will be positioned substantially against the ends of flanges 28 and 32 and flanges 30 and 34. This will make a compact symmetrical rotating unit which will operate for long periods without attention. However, if for any reason an overload should occur, detent wheel 16 will cause separation of plates 52 and 54 and allow escape of teeth 18 and rotation of shaft 10 and detent wheel 16 without damage.

End play of housing 22 is prevented by contact of bearing sleeve 40 with either star wheel 16 or bearing support 14.

Springs 72 and 74 may be adjusted by changing the position of a nut 85 on bolt 76, while springs 78 and 80 may be adjusted in a similar manner by means of a nut 86 on bolt 82. In this way, the maximum load at which the device will release can be adjusted.

Under normal conditions, plates 52 and 54 may be in contact or substantially in contact with flanges 28 and 32, as well as flanges 30 and 34, while at the same time in contact with teeth 18 of detent wheel 16. Under these conditions, there will be no lost motion or looseness in the device.

It is to be noted that the device is self contained, the pressure of the springs being transmitted to wheel 16 in a radial direction and on opposite sides so that the opposed forces neutralize each other and there is no resultant axial thrust on either shaft 10 or shaft 42. Furthermore, the device is complete within the housing 22, and does not extend along the shafts any substantial distance. It may therefore be used between closely coupled units where little shaft length is available.

Figure 4:
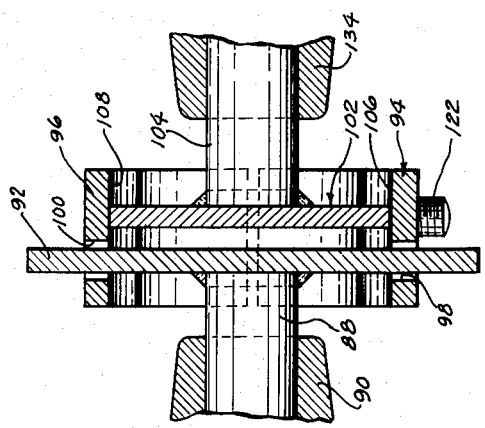

A modified embodiment of the device is shown in FIGS. 3 and 4, and which is adaptable particularly where both shafts are positively supported in bearings.

As seen in FIG. 4, a shaft 88 supported in a bearing 90 has a transverse drive transmitting plate 92 fixed thereto, generally oblong in shape, and arranged symmetrically on shaft 88. Diametrically opposed modified escape plates 94 and 96 are slotted at 98 and 100 and pressed toward each other about a detent wheel 102. Drive transmitting plate 92 extends preferably substantially normal to shaft 88 and has a sliding fit in slots 98 and 100 so that escape plates 94 and 96, while free to slide toward and away from shaft 88, are constrained to revolve by rotation of plate 92 in a circular path about shaft 88. Wheel 102 is fixed on a shaft 104 and in the present instance rotated by reason of revolving of escape plates 94 and 96, which are propelled by rotation of plate 92.

Escape plates 94 and 96 are notched at 106 and 108 in a manner analogous to that described in connection with FIG. 1, and are pressed toward each other by springs 110, 112, 114 and 116. Springs 110 and 112 are compressed against flange portions 118 and 120, respectively, on plates 94 and 96, springs 110 and 112 being compressed by a bolt 122 carrying a nut 124. In a similar manner, springs 114 and 116 are compressed by a bolt 126 and nut 128 and operate against flange portions 130 and 132.

Shaft 104 is carried in a bearing of any suitable type 134 so that it is not necessary for the overload coupling itself to serve to maintain alignment between shafts 88 and 104.

The operation of the device is thought to be clear from the foregoing disclosure, and it is desired to point out that the embodiment of FIGS. 1 and 2 will serve to "pilot" housing 22 and establish alignment between shafts 10 and 42. However, slight misalignment, as between shafts 10 and 50, can be tolerated to the extent of the tolerance of bearing 40 without detrimental effect.

In view of the relatively high teeth 18, or deep notches therebetween, considerable wear can take place on teeth 18 and plates 54 and 52 before sufficient change is caused in the relations between the detent wheel and the escape plates to cause any significant change in operation.

By reason of the particular construction of the device, while close fits may be used if desirable, generous tolerances are permissible, the parts are readily made as stampings of heavy sheet metal, holes may be punched during the stamping process, and a device may be furnished which is extremely simple, reliable and rugged.

If the shafts are supported substantially in alignment close to the coupling, a simplified version as seen in FIGS. 3 and 4 may be used, but which embodies many of the advantages of the first described arrangement.

Variations of the disclosed device may occur to those skilled in the art, and it is intended to cover in the following claims all such variations as fall within the spirit of the invention.

What is claimed as new and desired to be secured by Letters Patent of the United States is:

1. An overload release clutch including the combination of a shaft,
   a star wheel fixed on the shaft,
   a second shaft,
   a pair of notched jaw plates supported from the second shaft and engaged with the periphery of said star wheel,
   guiding means fixed in relation to said second shaft and connected with said jaw plates and guiding said jaw plates for sliding movement generally in the direction of a predetermined diameter of said second shaft, and
   means engaged with said jaw plates and arranged to yieldingly urge said jaw plates toward said star wheel.

2. An overload release clutch including the combination of a first shaft,
   a star wheel fixed on the shaft,
   a housing disposed about the star wheel,
   a bearing on the housing and journaled on the shaft,
   shaft means on the housing extending therefrom substantially coaxially with said first shaft,
   and a pair of notched escape ratchet plates movably supported on said housing and engaged with the periphery of said star wheel,
   means for guiding said escape ratchet plates for movement toward and away from said star wheel, and
   means engaged with said escape ratchet plates and arranged to yieldingly urge said escape ratchet plates toward said star wheel.

3. An overload release clutch including the combination of a first shaft,
   a detent wheel on said shaft,
   a plurality of outwardly extending teeth on the periphery of said detent wheel,
   a housing disposed about said detent wheel,
   a bearing on said housing and journaled on said shaft,
   shaft means on said housing extending therefrom in a direction coaxial with said first shaft,
   a pair of detent plates movably supported on said housing and having notches, at least one of said notches being engaged with one of the teeth on said detent wheel,
   said detent plates being guided by said housing for movement relative thereto in the direction of a predetermined diameter of said shaft means and housing,
   and spring means engaged with said detent plates and arranged to yieldingly urge said detent plates into engagement with the teeth of said detent wheel.

4. An overload release clutch including the combination of a driving shaft and a driven shaft,
   a star wheel fixed on one of said shafts,
   a drive transmitting plate fixed on the other shaft,
   an escape ratchet plate engaged with said drive transmitting plate and guided thereby for sliding movement thereon substantially exclusively in the direction of a predetermined radius of said other shaft,
   and said ratchet plate being also engaged with the periphery of said star wheel, and
   means engaged with said ratchet plate and arranged to yieldingly urge said ratchet plate toward said star wheel.

5. An overload release clutch including the combination of a first shaft,
   a star wheel fixed on the shaft and providing a plurality of peripheral teeth,
   a second shaft substantially in axial alignment with said first shaft,
   a pair of detent plates supported from said second shaft, each having a mid portion bending outwardly and again inwardly to form a notch for the reception of one of said teeth, guiding means fixed on said second shaft and having a sliding connection with said detent plates positioned to guide said detent plates for movement relative to said second shaft in the direction of a predetermined diameter of said second shaft, and means engaged with said detent plates and arranged to yieldingly urge said detent plates into engagement with said star wheel, whereby rotation of one of said shafts will cause rotation of the other by reason of the engagement of the bent portions of said detent plates with the teeth of said star wheel and the engagement of said detent plates with said guiding means except at such times as the force to be transmitted becomes sufficient to overcome the yielding means and displace said detent plates to allow escape of said teeth from said bent portions of said detent plates.

6. An overload release clutch including the combination of a first shaft, a star wheel on said first shaft and providing a plurality of outwardly extending peripheral teeth, a housing comprising a pair of opposed spaced housing shells, having portions bending inwardly to form end closures, and again outwardly to form flanges, means uniting the flanges of one shell with the flanges of the other shell, said housing being disposed about said star wheel, a bearing on one of said shells journaled on said first shaft for supporting said housing, shaft means on the other shell extending therefrom in a direction substantially coaxial with said first shaft, a pair of detent plates supported from said housing, each having a mid portion bending outwardly and again inwardly to form a notch for the reception of one of said teeth, means on said housing guiding said detent plates for movement toward and away from said star wheel, and spring means engaged with said detent plates and positioned to yieldingly urge said detent plates into contact with said star wheel.

7. An overload release clutch including the combination of a first shaft, a star wheel on said first shaft and providing a plurality of outwardly extending peripheral teeth, a housing comprising a pair of opposed spaced housing shells, having portions bending inwardly to form end closures, and again outwardly to form flanges, means uniting the flanges of one shell with the flanges of the other shell, said housing being disposed about said star wheel, a bearing on one of said shells journaled on said first shaft for supporting said housing, shaft means on the other shell extending therefrom in a direction substantially coaxial with said first shaft, a pair of detent plates supported from said housing, each having a mid portion bending outwardly and again inwardly to form a notch for the reception of one of said teeth, spaced bolts extending through said detent plates and through said housing transverse to said shafts, adjacent the inwardly bent portions of said shells in position to be forced into driving contact therewith by rotation of said star wheel, and consequent movement of said detent plates, and spring means engaged with said detent plates and positioned to yieldingly urge said detent plates into contact with said star wheel.

References Cited by the Examiner
UNITED STATES PATENTS

| | | | |
|---|---|---|---|
| 1,051,462 | 1/13 | Spellman et al. | 64—29 |
| 1,289,977 | 12/18 | Walker | 64—29 |
| 2,325,780 | 8/43 | Langford | 64—29 |
| 2,773,370 | 12/56 | Intraub et al. | 64—29 |
| 2,944,343 | 7/60 | Anthony | 64—29 |

FOREIGN PATENTS 550,602   5/32   Germany.

BROUGHTON G. DURHAM, *Primary Examiner.*

ROBERT C. RIORDON, *Examiner.*